US010589819B2

(12) United States Patent
Komada et al.

(10) Patent No.: US 10,589,819 B2
(45) Date of Patent: Mar. 17, 2020

(54) BICYCLE OPERATING DEVICE

(71) Applicant: SHIMANO INC., Sakai (JP)

(72) Inventors: Yasuyuki Komada, Sakai (JP); Takuro Jinbu, Sakai (JP); Tatsuya Matsushita, Sakai (JP)

(73) Assignee: SHIMANO INC., Sakai (JP)

( * ) Notice: Subject to any disclaimer, the term of this patent is extended or adjusted under 35 U.S.C. 154(b) by 382 days.

(21) Appl. No.: 15/191,970

(22) Filed: Jun. 24, 2016

(65) Prior Publication Data
US 2017/0088234 A1 Mar. 30, 2017

Related U.S. Application Data

(63) Continuation-in-part of application No. 14/871,938, filed on Sep. 30, 2015, now abandoned.

(51) Int. Cl.
*B62L 3/02* (2006.01)
*B62M 25/08* (2006.01)
*B62K 23/06* (2006.01)
*B62M 25/04* (2006.01)

(52) U.S. Cl.
CPC .............. *B62L 3/023* (2013.01); *B62K 23/06* (2013.01); *B62M 25/04* (2013.01); *B62M 25/08* (2013.01)

(58) Field of Classification Search
CPC ......... B62L 3/023; B62K 23/06; B62M 25/04
See application file for complete search history.

(56) References Cited

U.S. PATENT DOCUMENTS 5,636,518 A * 6/1997 Burgoyne .............. B62K 23/02
60/594
8,201,670 B2 * 6/2012 Tetsuka .................. B62L 3/023
188/24.22
8,764,125 B2 * 7/2014 Vezzoli .................. B60T 11/22
303/10

(Continued)

FOREIGN PATENT DOCUMENTS

CN 102101516 6/2011
CN 103847923 6/2014

(Continued)

OTHER PUBLICATIONS

EP 1398259 machine translation to English from espacenet. 2004.*

*Primary Examiner* — Nathaniel E Wiehe
*Assistant Examiner* — Michael Quandt
(74) *Attorney, Agent, or Firm* — Mori & Ward, LLP

(57) ABSTRACT

A bicycle operating device comprises a base member, an operating member, and a hydraulic unit. The base member comprises a first end portion, a second end portion, and a gripping portion. The gripping portion is provided between the first end portion and the second end portion. The operating member is movably mounted to the base member from a rest position toward an operated position. The hydraulic unit is provided at one of the base member and the operating member. The hydraulic unit comprises a hydraulic cylinder and a piston. The hydraulic cylinder includes a cylinder bore. The piston is arranged in the cylinder bore. The piston is configured to be pulled from an initial position to an actuated position in response to a movement of the operating member from the rest position toward the operated position to supply a hydraulic pressure toward at least one bicycle component.

24 Claims, 12 Drawing Sheets

(56) References Cited

U.S. PATENT DOCUMENTS

| | | | |
|---|---|---|---|
| 9,643,682 B2 * | 5/2017 | Kariyama | .............. B62K 23/06 |
| 2011/0147149 A1 | 6/2011 | Tetsuka et al. | |
| 2014/0144275 A1 | 5/2014 | Kariyama et al. | |
| 2015/0203169 A1 | 7/2015 | Nishino | |
| 2016/0264213 A1 * | 9/2016 | Swanson | ................ B62L 3/023 |

FOREIGN PATENT DOCUMENTS

| | | | | |
|---|---|---|---|---|
| DE | 10 2015 100 784 | | 7/2015 | |
| DE | 20 2015 002 728 U1 | | 8/2015 | |
| EP | 1398259 A2 | * | 3/2004 | ................ B60T 7/10 |
| GB | 800196 A | * | 8/1958 | .............. B62L 3/023 |
| GB | 1536353 A | * | 12/1978 | .............. B60T 11/16 |
| GB | 1590861 A | * | 6/1981 | ............ B60T 11/165 |
| GB | 2321682 B | | 8/1998 | |
| TW | 201420418 | | 6/2014 | |
| TW | M494742 U | | 2/2015 | |

\* cited by examiner

BICYCLE OPERATING DEVICE

CROSS-REFERENCE TO RELATED APPLICATIONS

The present application is a continuation-in-part application of the U.S. application Ser. No. 14/871,938 filed Sep. 30, 2015. The contents of this application are incorporated herein by reference in their entirety.

BACKGROUND OF THE INVENTION

Field of the Invention

The present invention relates to a bicycle operating device.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle operating device.

SUMMARY OF THE INVENTION

In accordance with a first aspect of the present invention, a bicycle operating device comprises a base member, an operating member, and a hydraulic unit. The base member comprises a first end portion, a second end portion, and a gripping portion. The second end portion is opposite to the first end portion. The gripping portion is provided between the first end portion and the second end portion. The operating member is movably mounted to the base member from a rest position toward an operated position. The hydraulic unit is provided at one of the base member and the operating member. The hydraulic unit comprises a hydraulic cylinder and a piston. The hydraulic cylinder includes a cylinder bore. The piston is arranged in the cylinder bore. The piston is configured to be pulled from an initial position to an actuated position in response to a movement of the operating member from the rest position toward the operated position to supply a hydraulic pressure toward at least one bicycle component.

With the bicycle operating device according to the first aspect, the piston is pulled from the initial position to the actuated position in response to the movement of the operating member from the rest position toward the operated position. Accordingly, it is possible to easily ensure the strength of the piston and/or a member transmitting a pulling force to the piston compared with a piston configured to receive a pushing force. This can improve the strength of the bicycle operating device.

In accordance with a second aspect of the present invention, the bicycle operating device according to the first aspect is configured so that the hydraulic unit is provided at the base member.

With the bicycle operating device according to the second aspect, it is possible to utilize the base member as at least part of a space in which the hydraulic unit is provided, allowing the bicycle operating device to be compact.

In accordance with a third aspect of the present invention, the bicycle operating device according to the second aspect is configured so that the first end portion is configured to be mounted to a handlebar. The piston is pulled from the initial position to the actuated position to move away from the first end portion in response to the movement of the operating member.

With the bicycle operating device according to the third aspect, it is possible to utilize a space between the first end portion and the operating member, allowing the bicycle operating device to be more compact.

In accordance with a fourth aspect of the present invention, the bicycle operating device according to the second or third aspect further comprises a biasing member to bias the piston from the actuated position toward the initial position. The biasing member is provided outside the cylinder bore.

With the bicycle operating device according to the fourth aspect, it is possible to select a position of the biasing member outside the cylinder bore, improving the degree of freedom of designing the bicycle operating device.

In accordance with a fifth aspect of the present invention, the bicycle operating device according to the fourth aspect is configured so that the biasing member is provided in the second end portion.

With the bicycle operating device according to the fifth aspect, it is possible to utilize the second end portion as at least part of a space in which the biasing member is provided, allowing the bicycle operating device to be more compact.

In accordance with a sixth aspect of the present invention, the bicycle operating device according to any one of the second to fifth aspects further comprises a hydraulic reservoir connected to the hydraulic cylinder.

With the bicycle operating device according to the sixth aspect, it is possible to absorb change in the hydraulic pressure due to change in usage environment such as a temperature. This improves the stability of operation of the bicycle operating device.

In accordance with a seventh aspect of the present invention, the bicycle operating device according to the sixth aspect is configured so that the hydraulic reservoir is provided at the base member.

With the bicycle operating device according to the seventh aspect, it is possible to utilize the base member as at least part of a space in which the hydraulic reservoir is provided, allowing the bicycle operating device to be more compact.

In accordance with an eighth aspect of the present invention, the bicycle operating device according to the seventh aspect is configured so that the hydraulic reservoir is at least partially provided above the hydraulic cylinder in a mounting state where the base member is mounted to the handlebar.

With the bicycle operating device according to the eighth aspect, it is possible to supply a hydraulic fluid to the hydraulic cylinder via the hydraulic reservoir, improving the maintenance of the bicycle operating device.

In accordance with a ninth aspect of the present invention, the bicycle operating device according to any one of the sixth to eighth aspects further comprises a bleeding port connected to the hydraulic reservoir to bleed a hydraulic fluid provided in the hydraulic reservoir.

With the bicycle operating device according to the ninth aspect, it is possible to bleed the hydraulic fluid from the hydraulic reservoir via the bleeding port, improving the maintenance of the bicycle operating device.

In accordance with a tenth aspect of the present invention, the bicycle operating device according to any one of the first to ninth aspects further comprises a first adjusting member to adjust the initial position of the piston relative to the cylinder bore.

With the bicycle operating device according to the tenth aspect, it is possible to effectively use an inner volume of the cylinder bore by adjusting the initial position of the piston via the first adjusting member.

In accordance with an eleventh aspect of the present invention, the bicycle operating device according to any one of the first to tenth aspects further comprises a second adjusting member to adjust the rest position of the operating member relative to the base member.

With the bicycle operating device according to the eleventh aspect, it is possible to adjust the rest position of the operating member to a preferred position for the user, improving the operability of the bicycle operating device.

In accordance with a twelfth aspect of the present invention, the bicycle operating device according to any one of the first to eleventh aspects further comprises a stabilizer to stabilize the operating member at the rest position relative to the base member.

With the bicycle operating device according to the twelfth aspect, it is possible to reduce rattling of the operating member caused by gaps provided in a coupling structure which couples the operating member to the base member.

In accordance with a thirteenth aspect of the present invention, the bicycle operating device according to any one of the first to twelfth aspects further comprises an electrical switch to receive an input operation. The electrical switch is provided at one of the base member and the operating member.

With the bicycle operating device according to the thirteenth aspect, it is possible to operate another bicycle component via the electrical switch.

In accordance with a fourteenth aspect of the present invention, the bicycle operating device according to the thirteenth aspect further comprises a connector to detachably receive an electrical control cable to electrically connect the electrical control cable to the electrical switch. The connector is provided at one of the base member and the operating member.

With the bicycle operating device according to the fourteenth aspect, it is possible to improve the maintenance of the bicycle operating device by detaching the electrical control cable from the connector.

In accordance with a fifteenth aspect of the present invention, the bicycle operating device according to the fourteenth aspect further comprises an electronic substrate electrically connected to the electrical switch and the connector. The electronic substrate is provided at one of the base member and the operating member.

With the bicycle operating device according to the fifteenth aspect, it is possible to install electronic parts on the electronic substrate for controlling the bicycle operating device. This can improve the degree of freedom of designing the bicycle operating device.

In accordance with a sixteenth aspect of the present invention, the bicycle operating device according to any one of the first to fifteenth aspects further comprises a shift operating unit provided at the base member to move a mechanical control cable.

With the bicycle operating device according to the sixteenth aspect, it is possible to operate another bicycle component such as a gear shifting device via the shift operating unit.

In accordance with a seventeenth aspect of the present invention, the bicycle operating device according to any one of the first to sixteenth aspects further comprises a mounting structure to mount the first end portion to the handlebar. The hydraulic cylinder is at least partially provided below the mounting structure in a mounting state where the base member is mounted to the handlebar.

With the bicycle operating device according to the seventeenth aspect, it is possible to effectively arrange the mounting structure and the hydraulic cylinder, allowing the bicycle operating device to be more compact.

In accordance with an eighteenth aspect of the present invention, the bicycle operating device according to any one of the first to seventeenth aspects is configured so that the first end portion includes a mounting surface. The mounting surface is in contact with the handlebar in a mounting state where the base member is mounted to the handlebar. The hydraulic cylinder includes an end plug to close an end of the cylinder bore. The end plug is provided on the mounting surface.

With the bicycle operating device according to the eighteenth aspect, it is possible to conceal the end plug by the handlebar in the mounting state, improving the appearance of the bicycle operating device.

In accordance with a nineteenth aspect of the present invention, the bicycle operating device according to any one of the first to eighteenth aspects further comprises a piston rod coupled to the piston, and a seal member in contact with the piston rod. The base member includes a through-hole coupled to the cylinder bore, and an arrangement portion on which the seal member is arranged. The piston rod extends through the through-hole. A first distance defined between an end of the cylinder bore and an end of the arrangement portion is equal to or longer than 1 mm.

With the bicycle operating device according to the nineteenth aspect, it is possible to improve a sealing performance between the piston rod and the through-hole.

In accordance with a twentieth aspect of the present invention, the bicycle operating device according to any one of the first to nineteenth aspects further comprises a piston rod coupled to the piston, and a seal member in contact with the piston rod. The base member includes a through-hole coupled to the cylinder bore, and an arrangement portion on which the seal member is arranged. The piston rod extends through the through-hole. A first distance defined between an end of the cylinder bore and an end of the arrangement portion is equal to or longer than 10% of a second distance defined between an end of the piston and the end of the cylinder bore in a state where the piston is at the initial position.

With the bicycle operating device according to the twentieth aspect, it is possible to improve a sealing performance between the piston rod and the through-hole.

In accordance with a twenty-first aspect of the present invention, a bicycle operating device comprises a base member, an operating member, and a hydraulic unit. The base member comprises a first end portion, a second end portion, and a gripping portion. The second end portion is opposite to the first end portion. The gripping portion is provided between the first end portion and the second end portion. The operating member is pivotally coupled to the base member about a pivot axis. The hydraulic unit is provided at the base member. The hydraulic unit comprises a hydraulic cylinder and a piston. The hydraulic cylinder includes a cylinder bore defining a center axis. The piston is arranged in the cylinder bore and is movable relative to the hydraulic cylinder along the center axis. The pivot axis is arranged below the center axis in a mounting state where the base member is mounted to the handlebar. The piston is closer to the first end portion than the pivot axis.

With the bicycle operating device according to the twenty-first aspect, the pivot axis of the operating member is arranged below the center axis of the hydraulic cylinder in the mounting state where the base member is mounted to the handlebar. Accordingly, it is possible to effectively arrange the hydraulic cylinder and the operating member, allowing the bicycle operating device to be compact.

In accordance with a twenty-second aspect of the present invention, a bicycle operating device comprises a base member, an operating member, a hydraulic unit, a piston rod, and a seal member. The base member is configured to be mounted to a handlebar. The base member includes a through-hole and an arrangement portion. The operating member is movably mounted to the base member from a rest position toward an operated position. The hydraulic unit is provided at one of the base member and the operating member. The hydraulic unit comprises a hydraulic cylinder and a piston. The hydraulic cylinder includes a cylinder bore coupled to the through-hole. The piston is arranged in the cylinder bore. The piston is configured to be pulled from an initial position to an actuated position in response to a movement of the operating member from the rest position toward the operated position to supply a hydraulic pressure toward at least one bicycle component. The piston rod is coupled to the piston and extending through the through-hole. The seal member is arranged on the arrangement portion to be in contact with the piston rod. A first distance defined between an end of the cylinder bore and an end of the arrangement portion is equal to or longer than 1 mm.

With the bicycle operating device according to the twenty-second aspect, it is possible to improve a sealing performance between the piston rod and the through-hole.

In accordance with a twenty-third aspect of the present invention, the bicycle operating device according to the twenty-second aspect is configured so that the base member comprises a first end portion, a second end portion, and a gripping portion. The first end portion is configured to be mounted to the handlebar. The second end portion is opposite to the first end portion. The gripping portion is provided between the first end portion and the second end portion.

With the bicycle operating device according to the twenty-third aspect, it is possible to improve a sealing performance between the piston rod and the through-hole in a case where the base member includes the gripping portion.

In accordance with a twenty-fourth aspect of the present invention, a bicycle operating device comprises a base member, an operating member, a hydraulic unit, a piston rod, and a seal member. The base member is configured to be mounted to a handlebar. The base member includes a through-hole and an arrangement portion. The operating member is movably mounted to the base member from a rest position toward an operated position. The hydraulic unit is provided at one of the base member and the operating member. The hydraulic unit comprises a hydraulic cylinder and a piston. The hydraulic cylinder includes a cylinder bore coupled to the through-hole. The piston is arranged in the cylinder bore. The piston is configured to be pulled from an initial position to an actuated position in response to a movement of the operating member from the rest position toward the operated position to supply a hydraulic pressure toward at least one bicycle component. The piston rod is coupled to the piston and extends through the through-hole. The seal member is arranged on the arrangement portion to be in contact with the piston rod. A first distance defined between an end of the cylinder bore and an end of the arrangement portion is equal to or longer than 10% of a second distance defined between an end of the piston and the end of the cylinder bore in a state where the piston is at the initial position.

With the bicycle operating device according to the twenty-fourth aspect, it is possible to improve a sealing performance between the piston rod and the through-hole.

In accordance with a twenty-fifth aspect of the present invention, the bicycle operating device according to the twenty-fourth aspects is configured so that the base member comprises a first end portion, a second end portion, and a gripping portion. The first end portion is configured to be mounted to the handlebar. The second end portion is opposite to the first end portion. The gripping portion is provided between the first end portion and the second end portion.

With the bicycle operating device according to the twenty-fifth aspect, it is possible to improve a sealing performance between the piston rod and the through-hole in a case where the base member includes the gripping portion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
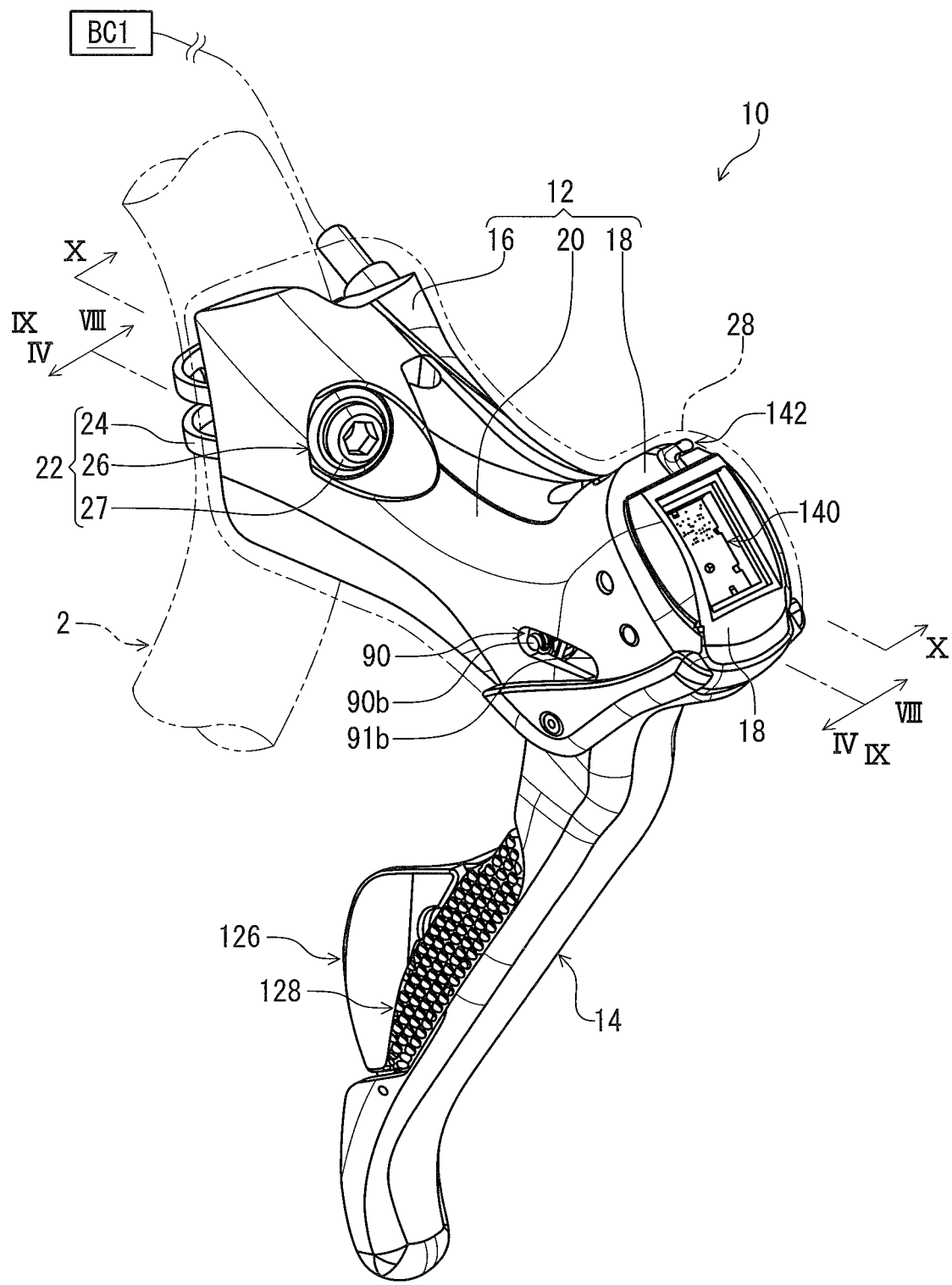
FIG. 1 is a perspective view of a bicycle operating device in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle operating device 10 in accordance with a first embodiment is configured to be mounted to a handlebar 2. In the illustrated embodiment, the bicycle operating device 10 is configured to be mounted to a drop-down handlebar. However, structures of the bicycle operating device 10 can be applied to other operating devices mounted to other type of handlebars such as a flat handlebar, a time trial handlebar, and a bull horn handlebar.

The bicycle operating device 10 is operatively coupled to at least one bicycle component to operate the at least one bicycle component. In this embodiment, the bicycle operating device 10 is operatively coupled to a hydraulic bicycle component BC1 such as a hydraulic brake device. The bicycle operating device 10 is operatively coupled to the hydraulic bicycle component BC1 via a hydraulic hose 4.

The bicycle operating device 10 is operatively coupled to an additional bicycle component BC2. Examples of the additional bicycle component include an electric bicycle component and a mechanical bicycle component. In this embodiment, the additional bicycle component BC2 includes an electric shifting device. The bicycle operating device 10 is operatively coupled to the additional bicycle component BC2 via an electrical control cable 6. The additional bicycle component BC2 can include other type of bicycle components such as a mechanical shifting device. Furthermore, the bicycle operating device 10 can be operatively coupled to the additional bicycle component BC2 via wireless communication.

In the illustrated embodiment, the bicycle operating device 10 is a right hand side control device configured to be operated by the rider's right hand to actuate the hydraulic bicycle component BC1. However, the structures of the bicycle operating device 10 can be applied to a left hand side control device.

In the present application, the following directional terms "front", "rear", "forward", "rearward", "left", "right", "transverse", "upward" and "downward" as well as any other similar directional terms refer to those directions which are determined on the basis of the user (e.g., the rider) who sits on a saddle (not shown) of a bicycle with facing the handlebar 2. Accordingly, these terms, as utilized to describe the bicycle operating device 10, should be interpreted relative to the bicycle equipped with the bicycle operating device 10 as used in an upright riding position on a horizontal surface.

Figure 2:
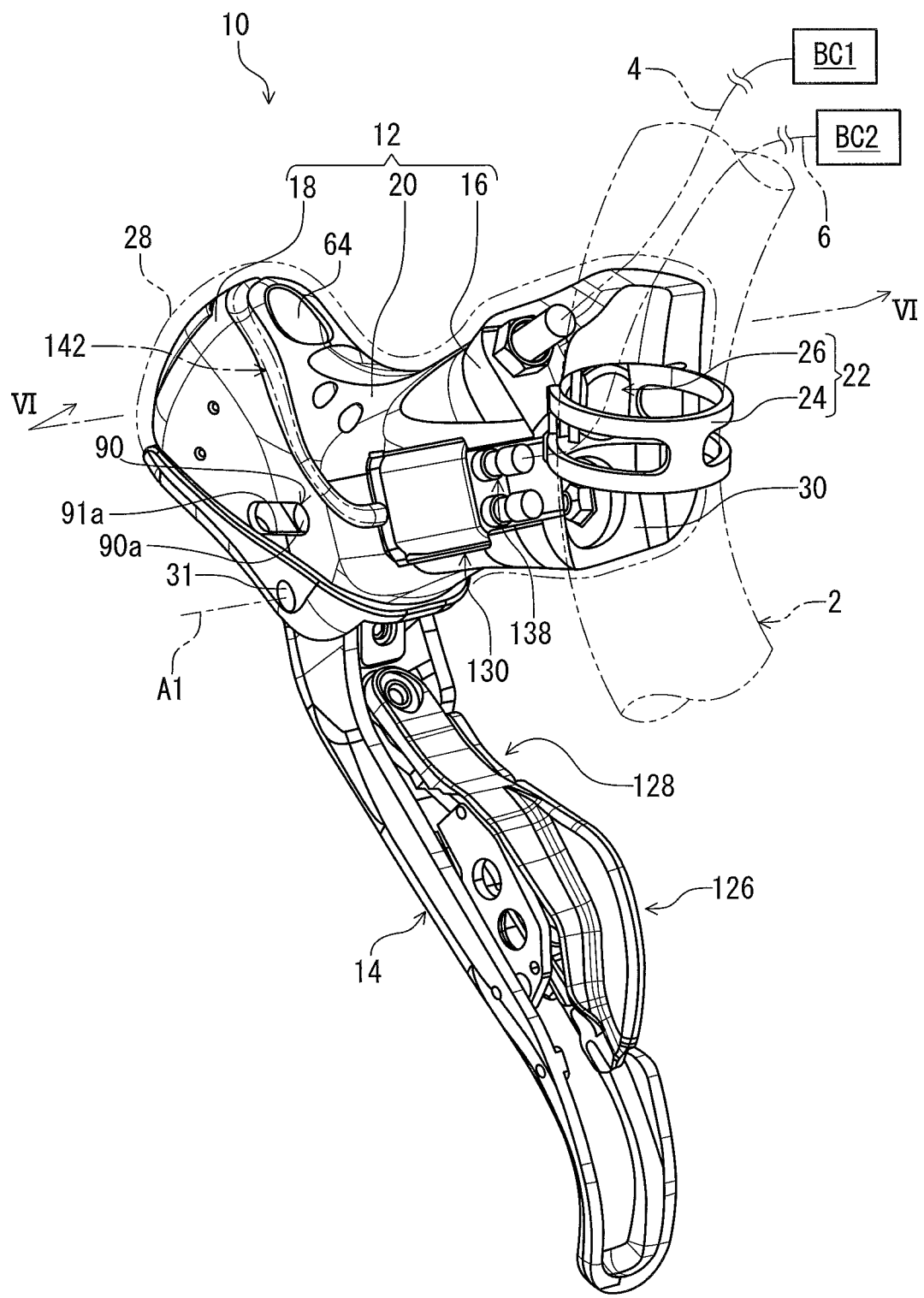
FIG. 2 is a perspective view of the bicycle operating device illustrated in FIG. 1.

As seen in FIGS. 1 and 2, the bicycle operating device 10 comprises a base member 12 and an operating member 14. The base member 12 comprises a first end portion 16, a second end portion 18, and a gripping portion 20. The first end portion 16 is configured to be mounted to the handlebar 2. The second end portion 18 is opposite to the first end portion 16. The gripping portion 20 is provided between the first end portion 16 and the second end portion 18.

The bicycle operating device 10 further comprises a mounting structure 22 to mount the first end portion 16 to the handlebar 2. The base member 12 is a stationary member when mounted to the handlebar 2. The mounting structure 22 preferably includes a band clamp 24 and a tightening member 26. The tightening member 26 is coupled to the band clamp 24 and includes a mounting bolt 27 (FIG. 1). The mounting structure 22 can include other structures which is similar to the band clamp 24 and which is used in a road shifter for mounting to a drop-down handlebar.

The base member 12 is covered by a grip cover 28 made of a non-metallic material such as rubber. Riders sometimes grip the base member 12 (e.g., the gripping portion 20) and lean on the base member 12 (e.g., the gripping portion 20) during riding.

As seen in FIG. 2, the first end portion 16 includes a mounting surface 30. The mounting surface 30 is in contact with the handlebar 2 in a mounting state where the base member 12 is mounted to the handlebar 2. In this embodiment, the mounting surface 30 has a concave curved shape. The mounting structure 22 is provided on the mounting surface 30.

Figure 3:
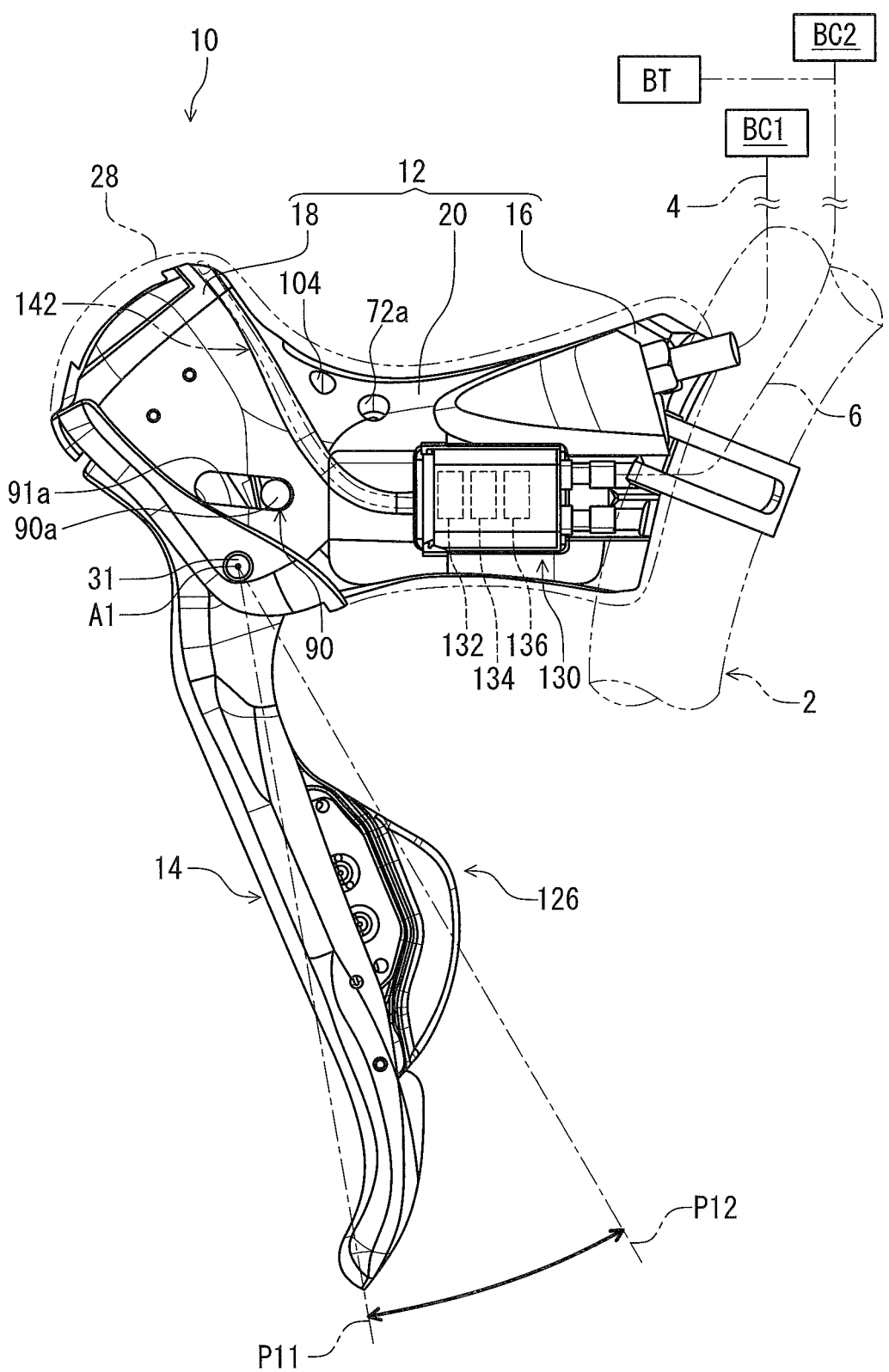
FIG. 3 is a side elevational view of the bicycle operating device illustrated in FIG. 1.

As seen in FIG. 3, the operating member 14 is movably mounted to the base member 12 from a rest position P11 toward an operated position P12. The operating member 14 is pivotally coupled to the base member 12 about a pivot axis A1. The operating member 14 is pivotable relative to the base member 12 between the rest position P11 and the operated position P12. The bicycle operating device 10 includes a pivot shaft 31 defining the pivot axis A1. The pivot shaft 31 pivotally couples the operating member 14 to the base member 12.

In the present application, the term "rest position" as used herein refers to a position at which a movable part such as the operating member 14 remains stationary in a state where the movable part is not operated by the user. The term "operated position" as used herein refers to a position at which the movable part has been operated by the user to perform the operation of a bicycle component such as the hydraulic bicycle component BC1.

Figure 4:
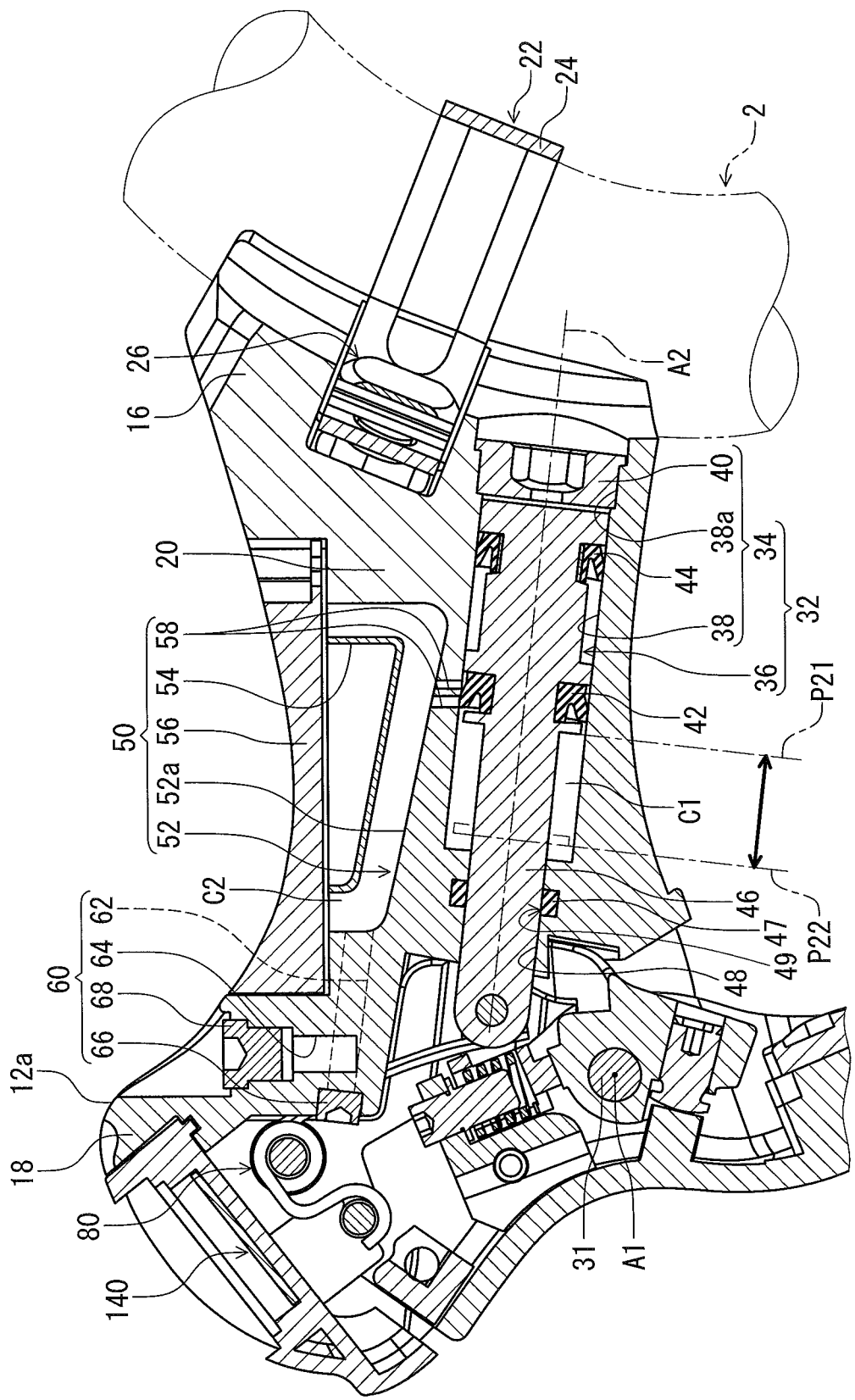
FIG. 4 is a cross-sectional view of the bicycle operating device taken along line IV-IV of FIG. 1.

As seen in FIG. 4, the bicycle operating device 10 comprises a hydraulic unit 32 provided at one of the base member 12 and the operating member 14. In this embodiment, the hydraulic unit 32 is provided at the base member 12. The hydraulic unit 32 is provided in the base member 12. However, the hydraulic unit 32 can be provided at the operating member 14.

The hydraulic unit 32 comprises a hydraulic cylinder 34 and a piston 36. The hydraulic cylinder 34 includes a cylinder bore 38. The piston 36 is arranged in the cylinder bore 38. The cylinder bore 38 defines a center axis A2. The piston 36 is movable relative to the hydraulic cylinder 34 along the center axis A2. The pivot axis A1 is arranged below the center axis A2 in the mounting state where the base member 12 is mounted to the handlebar 2. The piston 36 is closer to the first end portion 16 than the pivot axis A1.

In this embodiment, the hydraulic cylinder 34 is provided in the base member 12. The cylinder bore 38 is provided in the base member 12 and extends from the first end portion 16 toward the second end portion 18. The cylinder bore 38 extends from the mounting surface 30 toward the second end portion 18. The cylinder bore 38 is provided in the gripping portion 20.

The hydraulic cylinder 34 is at least partially provided below the mounting structure 22 in the mounting state where the base member 12 is mounted to the handlebar 2. In this embodiment, the hydraulic cylinder 34 is partially provided below the mounting structure 22 in the mounting state. An end opening 38a of the cylinder bore 38 is provided below the tightening member 26 of the mounting structure 22. However, the hydraulic cylinder 34 can be entirely provided below the mounting structure 22 in the mounting state. The hydraulic cylinder 34 includes an end plug 40 to close the end opening 38a of the cylinder bore 38. The end plug 40 is provided on the mounting surface 30.

The piston 36 is provided in the cylinder bore 38. The hydraulic unit 32 includes a first seal ring 42 and a second seal ring 44. The first seal ring 42 and the second seal ring 44 are attached to the piston 36. The first seal ring 42 is spaced apart from the second seal ring 44. The cylinder bore 38, the piston 36, and the first seal ring 42 define a hydraulic chamber C1. The hydraulic chamber C1 is filled with a hydraulic fluid such as mineral oil.

The bicycle operating device 10 further comprises a piston rod 46 and a seal member 47. The piston rod 46 is coupled to the piston 36 and extends from the piston 36 toward an opposite side of the first end portion 16 relative to the piston 36. The seal member 47 is in contact with the piston rod 46. While the piston rod 46 is integrally provided with the piston 36 as a one-piece unitary member in this embodiment, the piston rod 46 can be a separate member from the piston 36. The base member 12 includes a through-hole 48 coupled to the cylinder bore 38. The piston rod 46 extends through the through-hole 48 and is movably provided in the through-hole 48.

The piston 36 is configured to be pulled from an initial position P21 to an actuated position P22 in response to a movement of the operating member 14 from the rest position P11 toward the operated position P12 to supply a hydraulic pressure toward at least one bicycle component (e.g., the hydraulic bicycle component BC1). In this embodiment, the piston 36 is pulled from the initial position P21 to the actuated position P22 to move away from the first end portion 16 in response to the movement of the operating member 14. However, the arrangement of the piston 36 is not limited to this embodiment.

Figure 5:
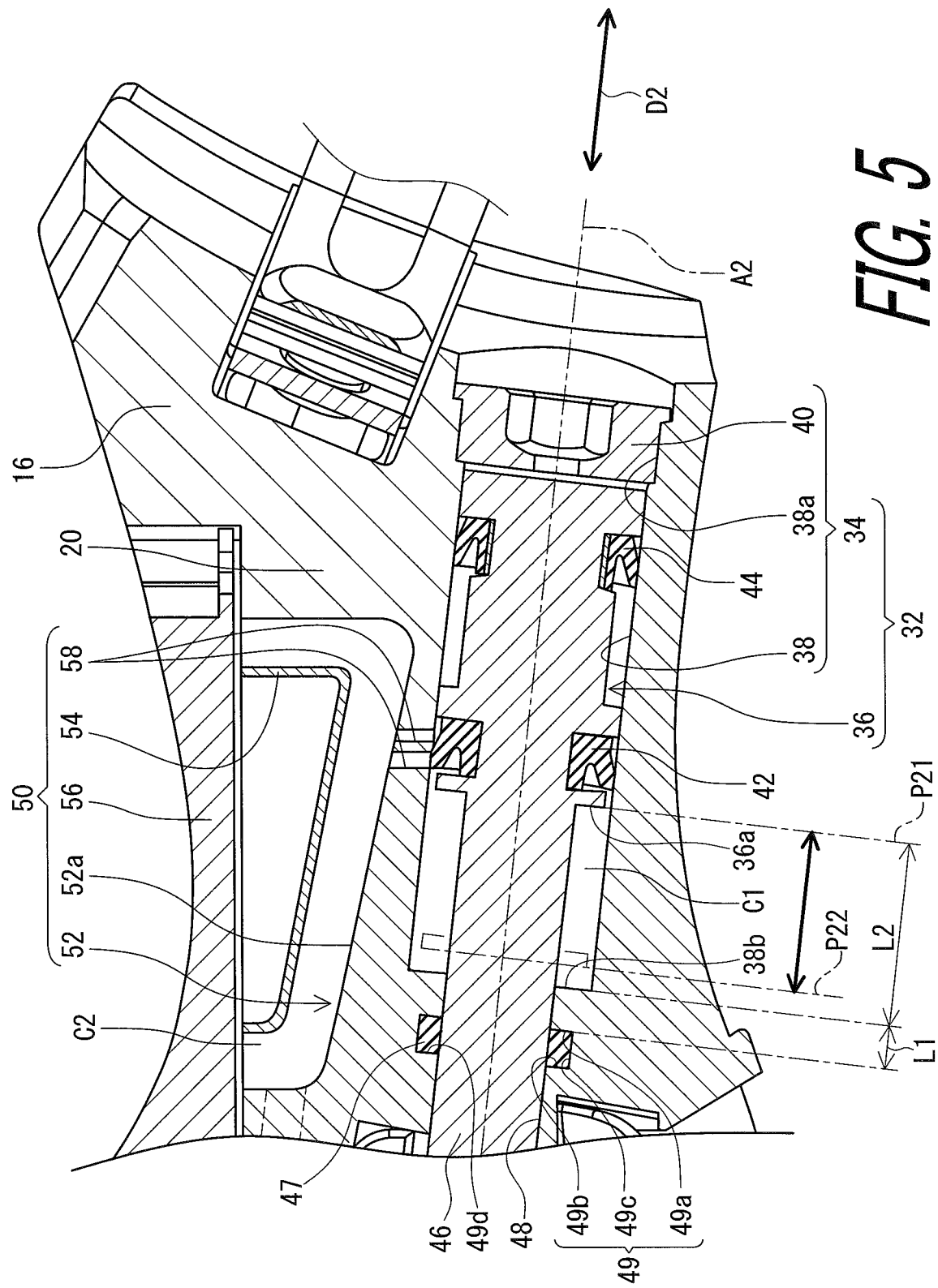
FIG. 5 is a partial enlarged cross-sectional view of the bicycle operating device illustrated in FIG. 1.

As seen in FIG. 5, the base member 12 includes an arrangement portion 49 on which the seal member 47 is arranged. The seal member 47 is arranged on the arrangement portion 49 to be in contact with the piston rod 46. A first distance L1 defined between an end 38b of the cylinder bore 38 and an end 49a of the arrangement portion 49 is equal to or longer than 1 mm. The first distance L1 is defined between the end 38b of the cylinder bore 38 and the end 49a of the arrangement portion 49 in a movement direction D2 in which the piston 36 is movable in the cylinder bore 38. For example, the first distance L1 is approximately 5.1 mm. However, the first distance L1 is not limited to this embodiment. For example, the first distance L1 can be equal to or longer than approximately 1 mm.

The end 49a of the arrangement portion 49 is one end closer to the cylinder bore 38 than the other end of the arrangement portion 49. In this embodiment, the arrangement portion 49 includes a first side surface 49a, a second side surface 49b, and a bottom surface 49c. The end 49a of the arrangement portion 49 can also be referred to as the first side surface 49a. The first side surface 49a is spaced apart from the second side surface 49b in the movement direction D2 and is closer to the cylinder bore 38 than the second side surface 49b in the movement direction D2. The first side surface 49a, the second side surface 49b, and the bottom surface 49c define an annular groove 49d. The seal member 47 is provided in the annular groove 49d to be in contact with the piston rod 46. The first distance L1 is defined between the end 38b of the cylinder bore 38 and the first side surface 49a in the movement direction D2. The first distance L1 can be defined between the end 38b of the cylinder bore 38 and the seal member 47 in the movement direction D2.

The cylinder bore 38 includes a bore-end surface 38b spaced apart from the piston 36 in the movement direction D2. The end 38b can also be referred to as the bore-end surface 38b. The bore-end surface 38b faces the piston 36 in the movement direction D2. The first distance L1 is defined between the bore-end surface 38b and the first side surface 49a in the movement direction D2.

The first distance L1 defined between the end 38b of the cylinder bore 38 and the end 49a of the arrangement portion 49 is equal to or longer than 10% of a second distance L2 defined between an end 36a of the piston 36 and the end 38b of the cylinder bore 38 in the state where the piston 36 is at the initial position P21. For example, the second distance L2 is in a range of 15.7107 mm to 16.7107 mm. Namely, the second distance L2 can be in a range of approximately 15 mm to approximately 16 mm. In a case where the first distance L1 is 5.1 mm, the first distance L1 is in a range of approximately 30.5% to approximately 32.5% of the second distance L2. However, the second distance L2 is not limited to this embodiment.

The piston 36 includes a piston-end surface 36a spaced apart from the end (the bore-end surface) 38b of the cylinder bore 38 in the movement direction D2. The end 36a of the piston 36 can also be referred to as the piston-end surface 36a. The piston-end surface 36a faces the end (the bore-end surface) 38b of the cylinder bore 38 in the movement direction D2. The second distance L2 is defined between the piston-end surface 36a and the bore-end surface 38b in the movement direction D2 in the state where the piston 36 is at the initial position P21.

As seen in FIGS. 4 and 5, the bicycle operating device 10 further comprises a hydraulic reservoir 50 connected to the hydraulic cylinder 34. In this embodiment, the hydraulic reservoir 50 is provided at the base member 12. The hydraulic reservoir 50 can be provided at the operating member 14 in a case where the hydraulic unit 32 is provided at the operating member 14.

The hydraulic reservoir 50 is at least partially provided above the hydraulic cylinder 34 in the mounting state where the base member 12 is mounted to the handlebar 2. In this embodiment, the hydraulic reservoir 50 is entirely provided above the hydraulic cylinder 34 in the mounting state where the base member 12 is mounted to the handlebar 2. However, the hydraulic reservoir 50 can be partially provided above the hydraulic cylinder 34 in the mounting state where the base member 12 is mounted to the handlebar 2.

The hydraulic reservoir 50 includes a reservoir tank 52, a diaphragm 54, and a cover 56. The reservoir tank 52 is provided on the base member 12 and includes a recess 52a. The diaphragm 54 is provided in the reservoir tank 52 to be elastically deformable in the reservoir tank 52. The cover 56 is secured to the base member 12 to cover the reservoir tank 52 and the diaphragm 54. The reservoir tank 52 and the diaphragm 54 define a reservoir chamber C2. The reservoir chamber C2 is filled with the hydraulic fluid such as mineral oil.

The hydraulic reservoir 50 includes communication holes 58. The communication holes 58 connects the reservoir chamber C2 with the hydraulic chamber C1 of the hydraulic unit 32 in a state where the piston 36 is positioned at the initial position P21. The communication holes 58 do not connect the reservoir chamber C2 with the hydraulic chamber C1 of the hydraulic unit 32 in a state where the piston 36 is not positioned at the initial position P21. The hydraulic reservoir 50 can be omitted from the bicycle operating device 10 or can be provided at the hydraulic bicycle component BC1.

As seen in FIG. 4, the bicycle operating device 10 further comprises a bleeding port 60 connected to the hydraulic reservoir 50 to bleed the hydraulic fluid provided in the hydraulic reservoir 50. The bleeding port 60 is connected to the reservoir chamber C2. In this embodiment, the bleeding port 60 includes a first bleeding passageway 62 and a second bleeding passageway 64. The first bleeding passageway 62 extends from the hydraulic reservoir 50 toward the second end portion 18. The second bleeding passageway 64 upwardly extends from the first bleeding passageway 62 to an upper surface 12a of the base member 12.

The bleeding port 60 includes a sealing plug 66 and a bleeding plug 68. An end opening 62a of the first bleeding passageway 62 is closed by the sealing plug 66. An end opening 64a of the second bleeding passageway 64 is closed by the bleeding plug 68. The bleeding plug 68 is detached from the bleeding port 60 to bleed the hydraulic fluid from the hydraulic reservoir 50.

Figure 6:
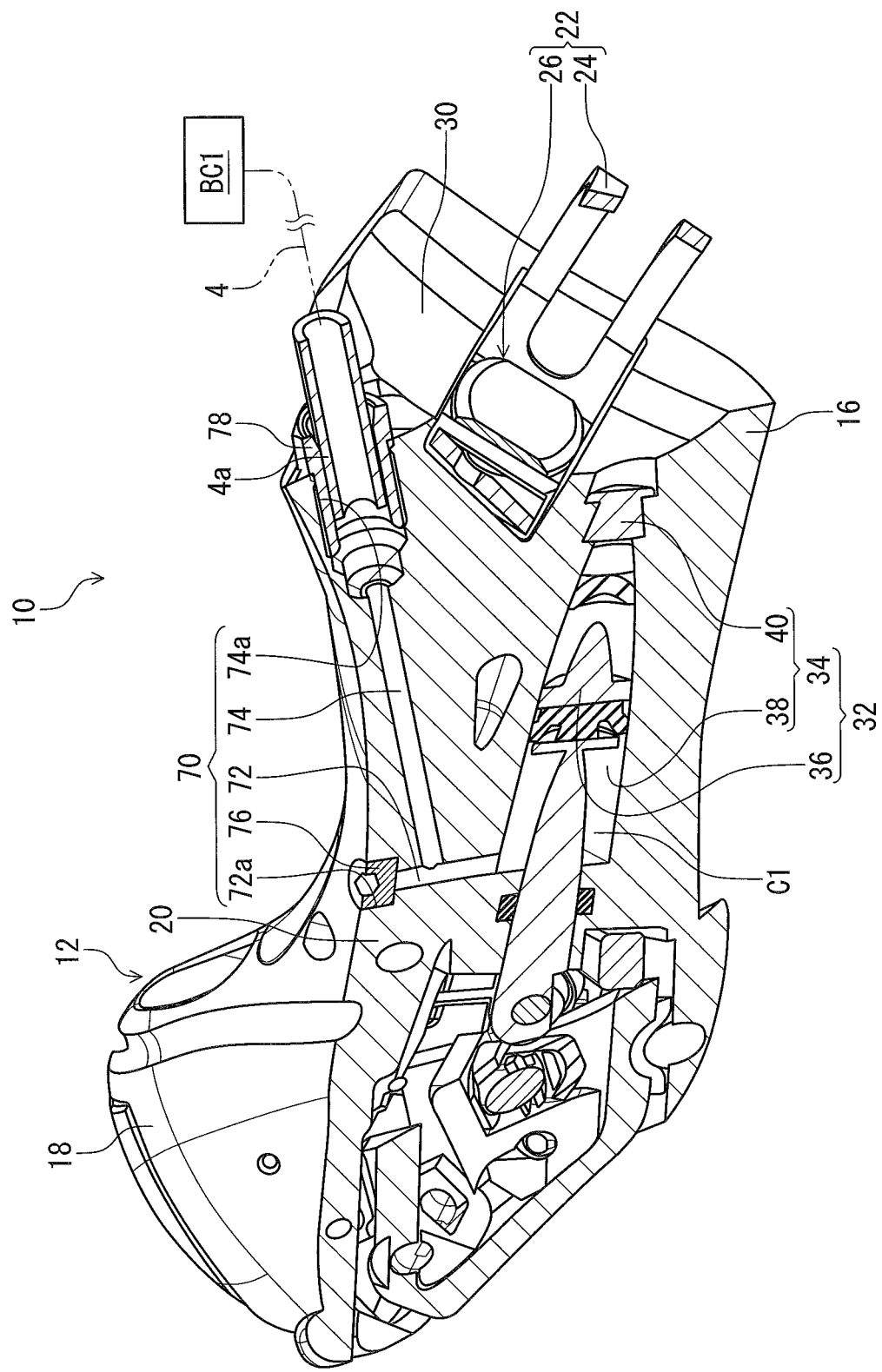
FIG. 6 is a cross-sectional view of the bicycle operating device taken along line VI-VI of FIG. 2.

As seen in FIG. 6, the bicycle operating device 10 includes an outlet port 70 connected to the hydraulic cylinder 34 to supply the hydraulic pressure to the hydraulic bicycle component BC1. The outlet port 70 is connected to the hydraulic chamber C1 of the hydraulic cylinder 34. The outlet port 70 includes a first outlet passageway 72 and a second outlet passageway 74. The first outlet passageway 72 extends from the hydraulic cylinder 34 to the upper surface of the base member 12. The second outlet passageway 74 extends from the first outlet passageway 72 to the first end portion 16. The outlet port 70 includes a sealing plug 76. An end opening 72a of the first outlet passageway 72 is closed by the sealing plug 76. An end 4a of the hydraulic hose 4 is connected to an end opening 74a of the second outlet passageway 74 via a connecting element 78.

As seen in FIG. 4, the bicycle operating device 10 further comprises a biasing member 80 to bias the piston 36 from the actuated position P22 toward the initial position P21. The biasing member 80 is provided outside the cylinder bore 38. In this embodiment, the biasing member 80 is provided in the second end portion 18. However, the biasing member 80 can be provided at positions other than the second end portion 18.

Figure 7:
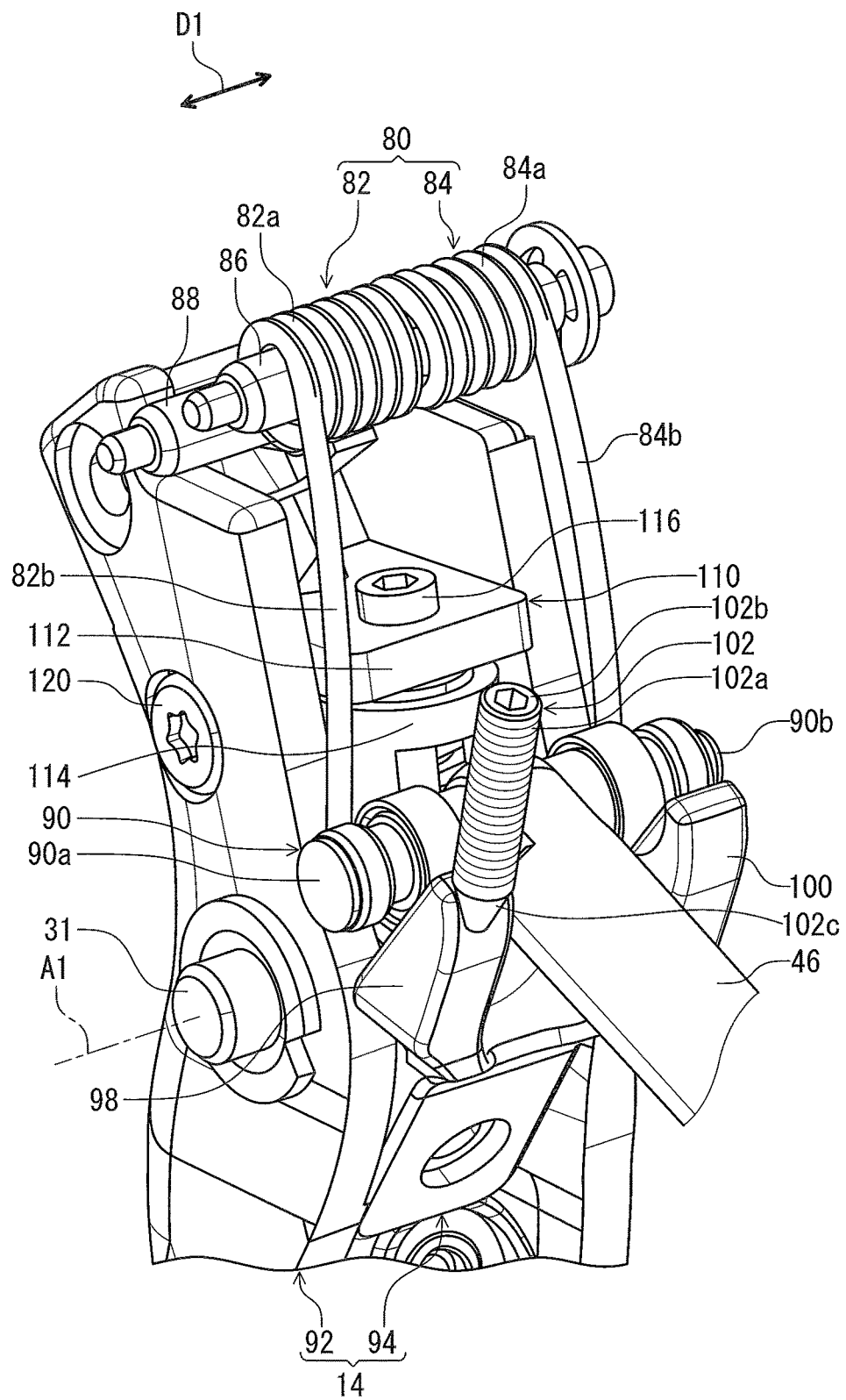
FIG. 7 is a perspective view of the bicycle operating device illustrated in FIG. 1 with a base member omitted.

As seen in FIG. 7, the biasing member 80 includes a first biasing element 82 and a second biasing element 84. While the first and second biasing elements 82 and 84 are torsion coil springs in this embodiment, the first and second biasing elements 82 and 84 can be other biasing elements such as a compression coil spring.

Figure 8:
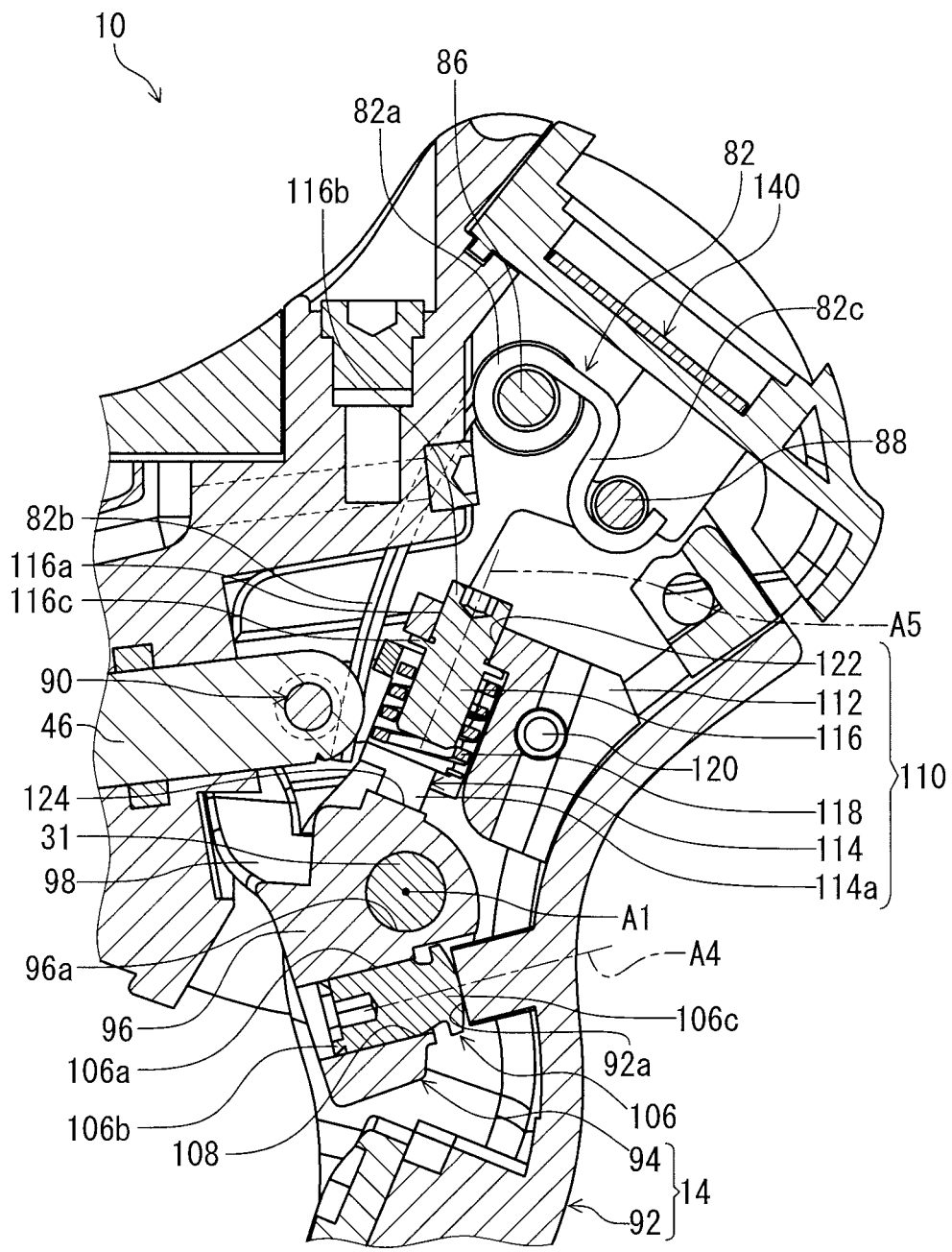
FIG. 8 is a partial cross-sectional view of the bicycle operating device taken along line VIII-VIII of FIG. 1.
Figure 9:
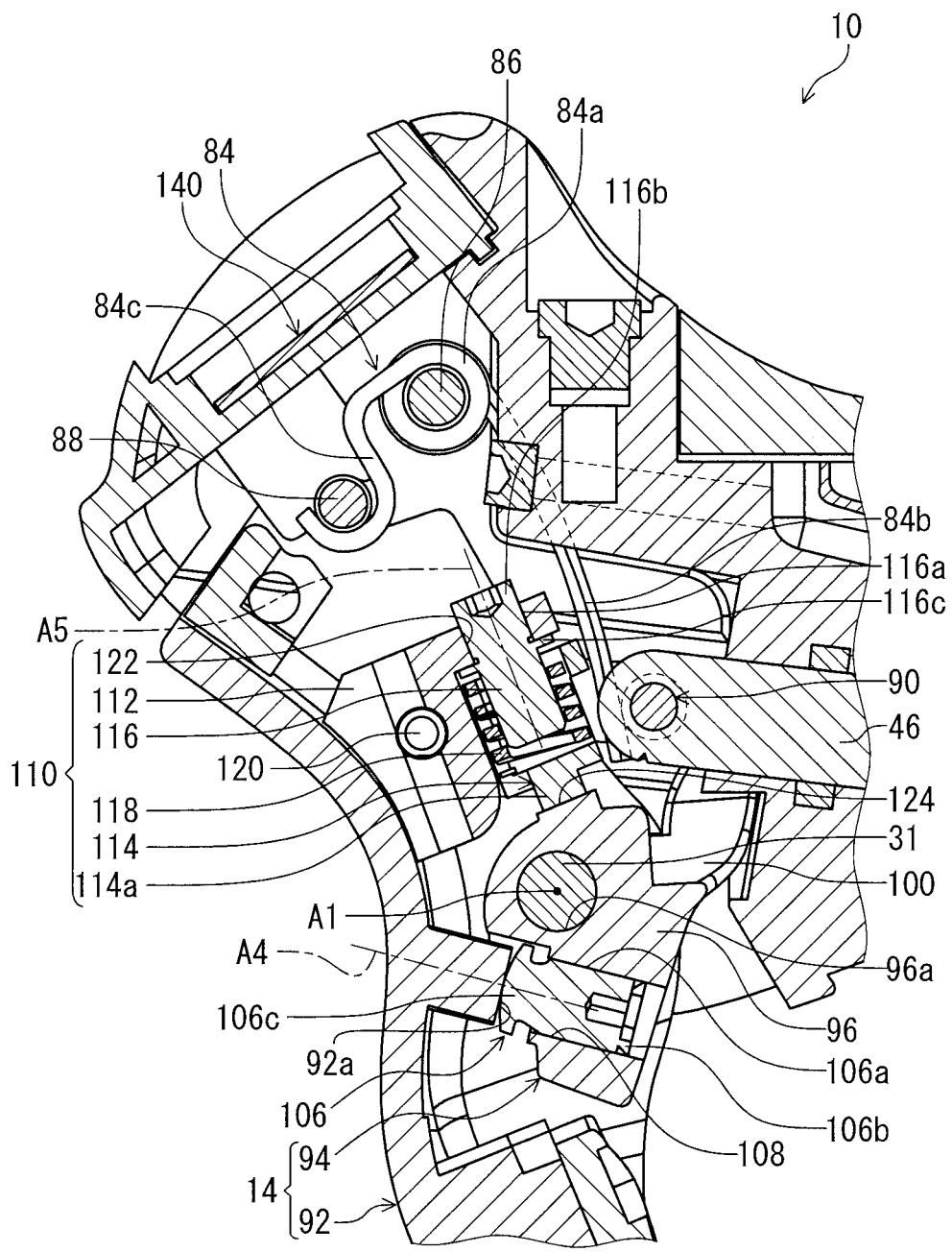
FIG. 9 is a partial cross-sectional view of the bicycle operating device taken along line IX-IX of FIG. 1.

As seen in FIGS. 7 to 9, the bicycle operating device 10 includes a first support shaft 86 and a second support shaft 88. The first support shaft 86 is secured to the base member 12 (FIG. 8) and extends in an axial direction D1 parallel to the pivot axis A1 of the operating member 14. The second support shaft 88 is secured to the base member 12 (FIG. 8) and extends in the axial direction D1. The first support shaft 86 and the second support shaft 88 are provided outside the hydraulic cylinder 34. The first and second biasing elements 82 and 84 are mounted on the first support shaft 86. The bicycle operating device 10 includes a coupling shaft 90 coupled to an end of the piston rod 46. The coupling shaft 90 extends in the axial direction D1.

As seen in FIGS. 7 and 8, the first biasing element 82 includes a coiled body 82a, a first arm 82b, and a second arm 82c. The coiled body 82a generates a biasing force to bias the piston 36. The first arm 82b and the second arm 82c extend from the coiled body 82a. The first arm 82b of the first biasing element 82 is engaged with the coupling shaft 90. The second arm 82c of the first biasing element 82 is engaged with the second support shaft 88.

As seen in FIGS. 7 and 9, the second biasing element 84 includes a coiled body 84a, a first arm 84b, and a second arm 84c. The coiled body 84a generates a biasing force to bias the piston 36. The first arm 84b and the second arm 84c extend from the coiled body 84a. The first arm 84b of the second biasing element 84 is engaged with the coupling shaft 90. The second arm 84c of the second biasing element 84 is engaged with the second support shaft 88.

As seen in FIGS. 1 to 3, the base member 12 includes a first guide groove 91a and a second guide groove 91b. As seen in FIG. 1, a first end 90a of the coupling shaft 90 is movably provided in the first guide groove 91a. As seen in FIG. 2, a second end 90b of the coupling shaft 90 is movably provided in the second guide groove 91b.

As seen in FIGS. 7 and 8, the operating member 14 is engaged with the coupling shaft 90. The biasing member 80 biases the operating member 14 relative to the base member 12 toward the rest position P11 (FIG. 4). In this embodiment, the operating member 14 includes an operating lever 92 and an intermediate body 94. The operating lever 92 is pivotally coupled to the base member 12 about the pivot axis A1 via the pivot shaft 31. The intermediate body 94 is a separate member from the operating lever 92. The intermediate body 94 is pivotally coupled to the base member 12 about the pivot axis A1 via the pivot shaft 31. The intermediate body 94 is engaged with the coupling shaft 90. Specifically, the intermediate body 94 includes a base part 96, a first protruding part 98, and a second protruding part 100. The first and second protruding parts 98 and 100 protrude from the base part 96. The first and second protruding parts 98 and 100 are engaged with the coupling shaft 90. The piston rod 46 is provided between the first and second protruding parts 98 and 100. As seen in FIG. 8, the base part 96 includes a pivot hole 96a. The pivot shaft 31 extends through the pivot hole 96a.

Figure 10:
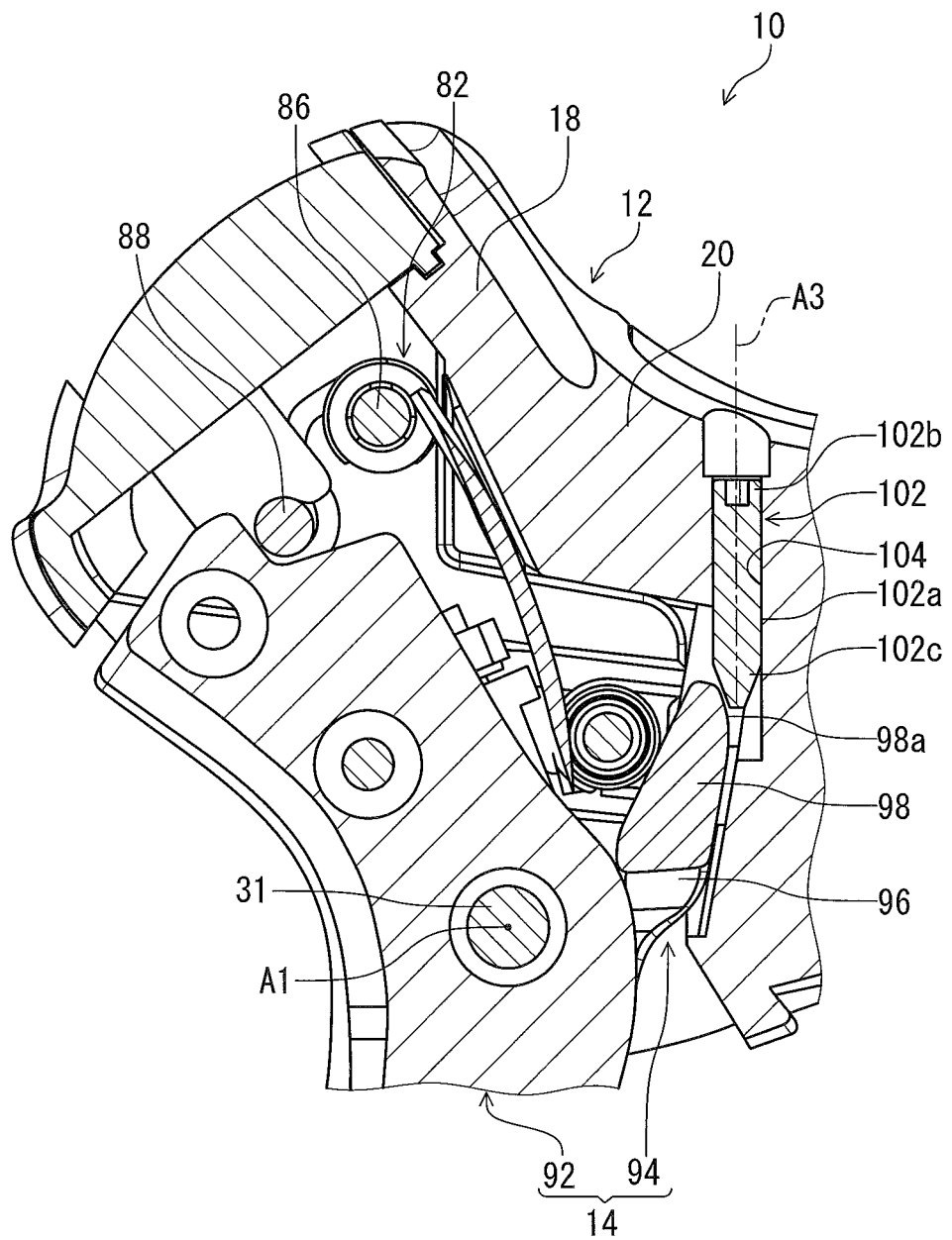
FIG. 10 is a partial cross-sectional view of the bicycle operating device taken along line X-X of FIG. 1.

As seen in FIGS. 7 and 10, the bicycle operating device 10 further comprises a first adjusting member 102 to adjust the initial position P21 (FIG. 4) of the piston 36 relative to the cylinder bore 38. In this embodiment, the first adjusting member 102 is mounted to the base member 12. The base member 12 include a first threaded hole 104 define a first center axis A3. The first adjusting member 102 is an adjustment screw and includes first external threads 102a threadedly engaged with the first threaded hole 104. The first adjusting member 102 includes a first tool engagement part 102b and a first contact part 102c. The first tool engagement part 102b includes a hexagon hole, for example.

The first contact part 102c is in contact with the first protruding part 98 of the intermediate body 94 of the operating member 14. Specifically, the biasing member 80 biases the first protruding part 98 of the intermediate body 94 against the first adjusting member 102. The first adjusting member 102 respectively positions the operating member 14 and the piston 36 (FIG. 4) at the rest position P11 and at the initial position P21. The first protruding part 98 includes a first receiving surface 98a. The first receiving surface 98a is inclined relative to the first center axis A3. The first contact part 102c has a tapered shape. The first contact part 102c is in contact with the first receiving surface 98a of the first protruding part 98.

Rotation of the first adjusting member 102 relative to the base member 12 about the first center axis A3 moves the first adjusting member 102 relative to the base member 12 along the first center axis A3. This rotates the intermediate body 94 relative to the base member 12 about the pivot axis A1 to move the piston 36 (FIG. 4) in the cylinder bore 38. Thus, it is possible to adjust the initial position P21 (FIG. 4) of the piston 36 relative to the hydraulic cylinder 34 by rotating the first adjusting member 102 relative to the base member 12. Furthermore, it is possible to adjust the rest position P11 (FIG. 3) of the operating member 14 relative to the base member 12 by rotating the first adjusting member 102 relative to the base member 12. The first adjusting member 102 can be omitted from the bicycle operating device 10.

As seen in FIG. 9, the bicycle operating device 10 further comprises a second adjusting member 106 to adjust the rest position P11 of the operating member 14 relative to the base member 12. In this embodiment, the second adjusting member 106 is mounted to the operating member 14. The second adjusting member 106 is mounted to the intermediate body 94 of the operating member 14. The intermediate body 94 include a second threaded hole 108 defining a second center axis A4. The second adjusting member 106 is an adjustment screw and includes second external threads 106a threadedly engaged with the second threaded hole 108. The second adjusting member 106 includes a second tool engagement part 106b and a second contact part 106c. The operating lever 92 includes a second receiving surface 92a. The second tool engagement part 106b includes a hexagon hole, for example. The second contact part 106c is in contact with the second receiving surface 92a.

Rotation of the second adjusting member 106 relative to the intermediate body 94 about the second center axis A4 moves the second adjusting member 106 relative to the intermediate body 94 along the second center axis A4. This rotates the operating lever 92 relative to the intermediate body 94 about the pivot axis A1. Thus, it is possible to adjust the rest position P11 (FIG. 3) of the operating member 14 relative to the hydraulic cylinder 34 by rotating the second adjusting member 106. Specifically, it is possible to adjust the rest position P11 (FIG. 3) of the operating member 14 relative to the hydraulic cylinder 34 by rotating the second adjusting member 106 without moving the initial position P21 (FIG. 4) of the piston 36 relative to the base member 12. The second adjusting member 106 can be omitted from the bicycle operating device 10.

As seen in FIGS. 7 to 9, the bicycle operating device 10 further comprises a stabilizer 110 to stabilize the operating member 14 at the rest position P11 relative to the base member 12. In this embodiment, the stabilizer 110 is provided at the operating member 14. The stabilizer 110 biases the intermediate body 94 relative to the operating lever 92 to push the second adjusting member 106 against the second receiving surface 92a of the operating lever 92. The stabilizer 110 includes a support part 112, a movable body 114, an adjusting part 116, and a biasing part 118.

The support part 112 is secured to the operating lever 92 by fasteners 120. The support part 112 includes a third threaded hole 122 defining a third center axis A5. The adjusting part 116 is an adjustment screw and includes third external threads 116a threadedly engaged with the third threaded hole 122. The adjusting part 116 includes a third tool engagement part 116b and a flange part 116c. The third tool engagement part 116b includes a hexagon hole, for example. The biasing part 118 is provided between the flange part 116c and the movable body 114 in a compressed manner.

The movable body 114 is movably mounted to the support part 112 along the third center axis A5. The movable body 114 includes a third contact part 114a. The intermediate body 94 includes a third receiving surface 124. The third contact part 114a is in contact with the third receiving surface 124. The biasing part 118 biases the movable body 114 against the intermediate body 94 of the operating member 14. Since the third center axis A5 is offset from the pivot axis A1, a rotational force is applied to the intermediate body 94 relative to the operating lever 92. This pushes the second adjusting member 106 against the second receiving surface 92a of the operating member 14, stabilizing the relative position between the operating lever 92 and the intermediate body 94.

Rotation of the adjusting part 116 relative to the support part 112 about the third center axis A5 moves the adjusting part 116 relative to the support part 112 along the third center axis A5. This changes an amount of compression of the biasing part 118 to adjust a biasing force applied from the biasing part 118 to the movable body 114. The stabilizer 110 can be omitted from the bicycle operating device 10. The stabilizer 110 can include other structures different from the above structure.

As seen in FIGS. 1 and 2, the bicycle operating device 10 further comprises an electrical switch to receive an input operation. In this embodiment, the bicycle operating device 10 comprise electrical switches 126 and 128. The electrical switch 126 is provided at one of the base member 12 and the operating member 14. The electrical switch 128 is provided at one of the base member 12 and the operating member 14. While the electrical switches 126 and 128 are provided at the operating member 14 in this embodiment, the electrical switches 126 and 128 can be provided at the base member 12. The electrical switch 126 receives an upshift input operation from the user. The electrical switch 128 receives a downshift input operation from the user.

As seen in FIG. 2, the bicycle operating device 10 includes a control unit 130. The electrical switches 126 and 128 are electrically connected to the control unit 130. As seen in FIG. 3, the control unit 130 includes a processor 132 and a memory 134. The processor 132 is electrically connected to the memory 134. The processor 132 includes a central processing unit (CPU). The memory 134 stores programs and other information. The memory 134 includes a read only memory (ROM) and a random access memory (RAM). For example, a program stored in the memory 134 is read into the processor 132, and thereby several functions of the control unit 130 are performed.

The control unit 130 is electrically connected to the additional bicycle component BC2 via the electrical control cable 6 using power line communication technology. Power line communication (PLC) carries data on a conductor that is also used simultaneously for electric power transmission or electric power distribution to the electric component. The control unit 130 includes a PLC controller 136. The PLC controller 136 receives an upshifting signal and a downshifting signal from the electrical switches 126 and 128. The PLC controller 136 superimposes the upshifting signal or the downshifting signal on a power source voltage flowing in the electrical control cable 6. The power source voltage is supplies from a battery BT via the electrical control cable 6.

As seen in FIG. 2, the bicycle operating device 10 further comprises a connector 138 to detachably receive the electrical control cable 6 to electrically connect the electrical control cable 6 to the electrical switch 126 and/or 128. The connector 138 is provided at one of the base member 12 and the operating member 14. In this embodiment, the connector 138 is provided at the base member 12. The connector 138 is electrically connected to the control unit 130. The connector 138 electrically connects the electrical control cable 6 to each of the electrical switches 126 and 128. The connector 138 is electrically connected to each of the electrical switches 126 and 128 via the control unit 130.

In this embodiment, the bicycle operating device 10 is electrically connected to the additional bicycle component BC2 via the electrical control cable 6. However, the bicycle operating device 10 can be wirelessly connected to the additional bicycle component BC2 via the wireless communication. In such an embodiment, the control unit 130 includes a wireless transmitter, and the connector 138 is omitted from the bicycle operating device 10.

As seen in FIG. 1, the bicycle operating device 10 further comprises an electronic substrate 140 electrically connected to the electrical switch 126 and/or 128 and the connector 138. The electronic substrate 140 is provided at one of the base member 12 and the operating member 14. In this embodiment, the electronic substrate 140 is provided at the second end portion 18 of the base member 12. The electronic substrate 140 is electrically connected to each of the electrical switches 126 and 128 and the connector 138. The electronic substrate 140 is electrically connected to the control unit 130 via an intermediate electrical cable 142. The electrical switches 126 and 128 are electrically connected to the electronic substrate 140 via an electrical cable (not shown). The electrical switches 126 and 128 are electrically connected to the connector 138 via the electronic substrate 140 and the control unit 130. Electric parts can be mounted on the electronic substrate 140. For example, at least one of the processor 132, the memory 134, and the PLC controller 136 can be mounted on the electronic substrate 140.

The bicycle operating device 10 has the following features.

(1) The piston 36 is pulled from the initial position P21 to the actuated position P22 in response to the movement of the operating member 14 from the rest position P11 toward the operated position P12. Accordingly, it is possible to easily ensure the strength of the piston 36 and/or a member transmitting a pulling force to the piston 36 compared with a piston configured to receive a pushing force. This can improve the strength of the bicycle operating device 10.

(2) Since the hydraulic unit 32 is provided at the base member 12, it is possible to utilize the base member 12 as at least part of a space in which the hydraulic unit 32 is provided, allowing the bicycle operating device 10 to be compact.

(3) The piston 36 is pulled from the initial position P21 to the actuated position P22 to move away from the first end portion 16 in response to the movement of the operating member 14. Accordingly, it is possible to utilize a space between the first end portion 16 and the operating member 14, allowing the bicycle operating device 10 to be more compact.

(4) Since the biasing member 80 is provided outside the cylinder bore 38, it is possible to select a position of the biasing member 80 outside the cylinder bore 38, improving the degree of freedom of designing the bicycle operating device 10.

(5) Since the biasing member 80 is provided in the second end portion 18, it is possible to utilize the second end portion 18 as at least part of a space in which the biasing member 80 is provided, allowing the bicycle operating device 10 to be more compact.

(6) Since the bicycle operating device 10 further comprises the hydraulic reservoir 50 connected to the hydraulic cylinder 34, it is possible to absorb change in the hydraulic pressure due to change in usage environment such as a temperature. This improves the stability of operation of the bicycle operating device 10.

(7) Since the hydraulic reservoir 50 is provided at the base member 12, it is possible to utilize the base member 12 as at least part of a space in which the hydraulic reservoir 50 is provided, allowing the bicycle operating device 10 to be more compact.

(8) The hydraulic reservoir 50 is at least partially provided above the hydraulic cylinder 34 in a mounting state where the base member 12 is mounted to the handlebar 2. Accordingly, it is possible to supply the hydraulic fluid to the hydraulic cylinder 34 via the hydraulic reservoir 50, improving the maintenance of the bicycle operating device 10.

(9) The bicycle operating device 10 further comprises the bleeding port 60 connected to the hydraulic reservoir 50 to bleed the hydraulic fluid provided in the hydraulic reservoir 50. Accordingly, it is possible to bleed the hydraulic fluid from the hydraulic reservoir 50 via the bleeding port 60, improving the maintenance of the bicycle operating device 10.

(10) The bicycle operating device 10 further comprises the first adjusting member 102 to adjust the initial position P21 of the piston 36 relative to the cylinder bore 38. Accordingly, it is possible to effectively use an inner volume of the cylinder bore 38 by adjusting the initial position P21 of the piston 36 via the first adjusting member 102.

(11) The bicycle operating device 10 further comprises the second adjusting member 106 to adjust the rest position P11 of the operating member 14 relative to the base member 12. Accordingly, it is possible to adjust the rest position P11 of the operating member 14 to a preferred position for the user, improving the operability of the bicycle operating device 10.

(12) The bicycle operating device 10 further comprises the stabilizer 110 to stabilize the operating member 14 at the rest position P11 relative to the base member 12. Accordingly, it is possible to reduce rattling of the operating member 14 caused by gaps provided in a coupling structure which couples the operating member 14 to the base member 12.

(13) The bicycle operating device 10 further comprises the electrical switch 126 and/or 128 to receive the input operation. The electrical switch 126 and/or 128 is provided at one of the base member 12 and the operating member 14. Accordingly, it is possible to operate another bicycle component via the electrical switch 126 and/or 128.

(14) The bicycle operating device 10 further comprises the connector 138 to detachably receive the electrical control cable 6 to electrically connect the electrical control cable 6 to the electrical switch 126. The connector 138 is provided at one of the base member 12 and the operating member 14. Accordingly, it is possible to improve the maintenance of the bicycle operating device 10 by detaching the electrical control cable 6 from the connector 138.

(15) The bicycle operating device 10 further comprises the electronic substrate 140 electrically connected to the electrical switch 126 and the connector 138. The electronic substrate 140 is provided at one of the base member 12 and the operating member 14. Accordingly, it is possible to install electronic parts on the electronic substrate 140 for controlling the bicycle operating device 10. This can improve the degree of freedom of designing the bicycle operating device 10.

(16) The bicycle operating device 10 further comprises the mounting structure 22 to mount the first end portion 16 to the handlebar 2. The hydraulic cylinder 34 is at least partially provided below the mounting structure 22 in a mounting state where the base member 12 is mounted to the handlebar 2. Accordingly, it is possible to effectively arrange the mounting structure 22 and the hydraulic cylinder 34, allowing the bicycle operating device 10 to be more compact.

(17) Since the end plug 40 is provided on the mounting surface 30, it is possible to conceal the end plug 40 by the handlebar 2 in the mounting state, improving the appearance of the bicycle operating device 10.

(18) The pivot axis A1 of the operating member 14 is arranged below the center axis A2 of the hydraulic cylinder 34 in the mounting state where the base member 12 is mounted to the handlebar 2. Accordingly, it is possible to effectively arrange the hydraulic cylinder 34 and the operating member 14, allowing the bicycle operating device 10 to be compact.

(19) Since the first distance L1 defined between the end 38b of the cylinder bore 38 and the end 49a of the arrangement portion 49 is equal to or longer than 1 mm, it is possible to improve a sealing performance between the piston rod 46 and the through-hole 48.

(20) The first distance L1 defined between the end 38b of the cylinder bore 38 and the end 49a of the arrangement portion 49 is equal to or longer than 10% of the second distance L2 defined between the end 36a of the piston 36 and the end 38b of the cylinder bore 38 in the state where the piston 36 is at the initial position P21. Accordingly, it is possible to improve a sealing performance between the piston rod 46 and the through-hole 48.

Second Embodiment

A bicycle operating device 210 in accordance with a second embodiment will be described below referring to FIG. 11. The bicycle operating device 210 has the same structures and/or configurations as those of the bicycle operating device 10 except for the electrical switch. Thus, elements having substantially the same function as those in the first embodiment will be numbered the same here, and will not be described and/or illustrated again in detail here for the sake of brevity.

Figure 11:
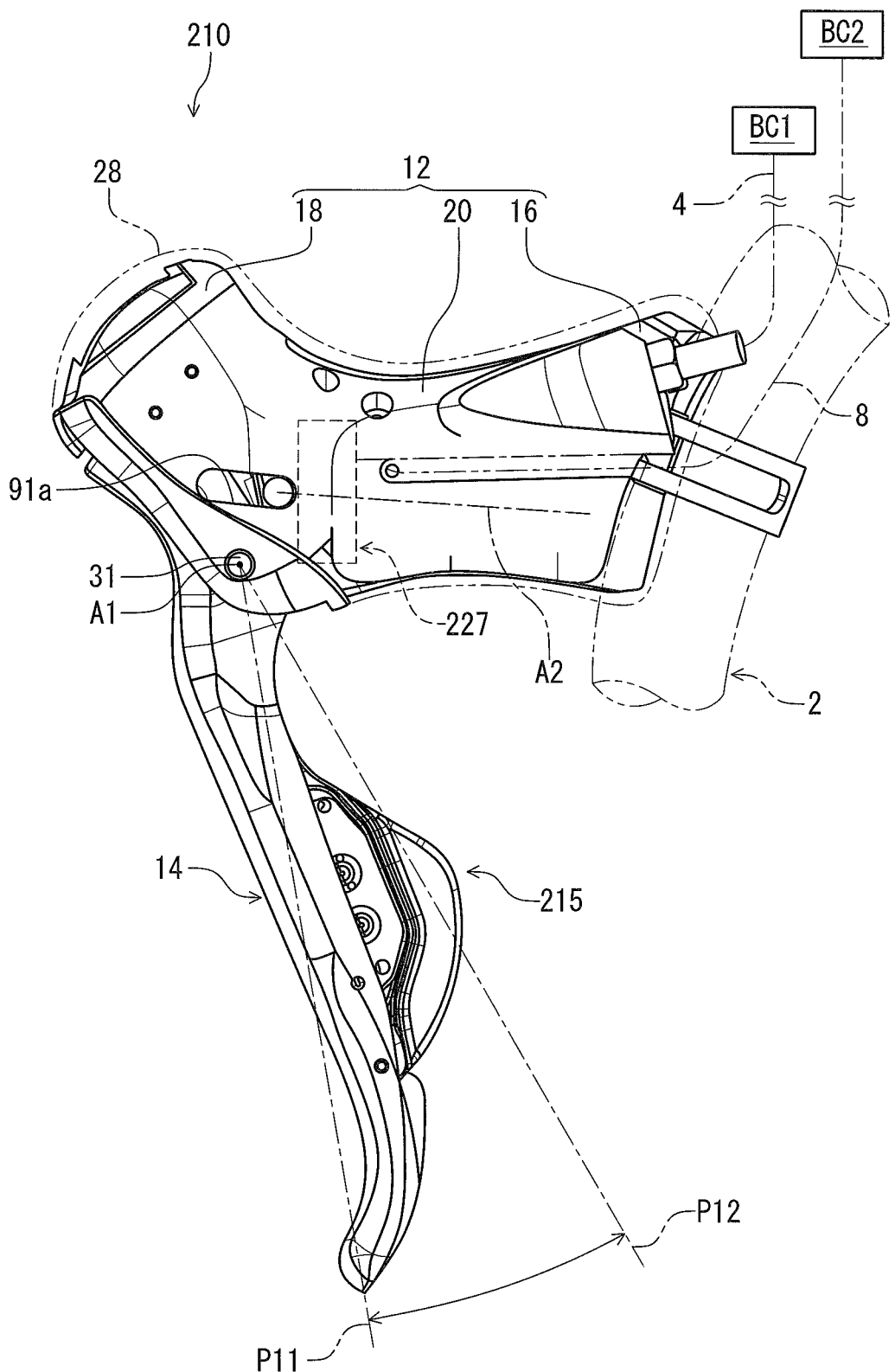
FIG. 11 is a side elevational view of a bicycle operating device in accordance with a second embodiment.

As seen in FIG. 11, the bicycle operating device 210 further comprises a shift operating unit 227 instead of the electrical switches 126 and 128. The shift operating unit 227 is provided at the base member 12 to move a mechanical control cable 8. The shift operating unit 227 is mechanically connected to an additional bicycle component BC2 such as a mechanical shifting device via the mechanical control cable 8. Examples of the mechanical control cable 8 include a Bowden cable.

In this embodiment, the operating member 14 is pivotally coupled to the base member 12 about the center axis A2 of the cylinder bore 38 (FIG. 4). The bicycle operating device 210 includes an additional operating member 215. The additional operating member 215 is pivotally mounted to the operating member 14. An inner wire of the mechanical control cable 8 is pulled when the operating member 14 is pivoted relative to the base member 12 about the center axis A2. The inner wire of the mechanical control cable 8 is retuned (released) when the additional operating member 215 is pivoted relative to the operating member 14. Since structures of the shift operating unit 227 have been known in the bicycle field, they will not be described and/or illustrated in detail here for the sake of brevity.

Since the bicycle operating device 210 further comprises the shift operating unit 227, it is possible to operate another bicycle component such as the mechanical shifting device via the shift operating unit 227.

Third Embodiment

A bicycle operating device 310 in accordance with a third embodiment will be described below referring to FIG. 12. The bicycle operating device 310 has the same structures and/or configurations as those of the bicycle operating device 10 except for the electrical switch. Thus, elements having substantially the same function as those in the first embodiment will be numbered the same here, and will not be described and/or illustrated again in detail here for the sake of brevity.

Figure 12:
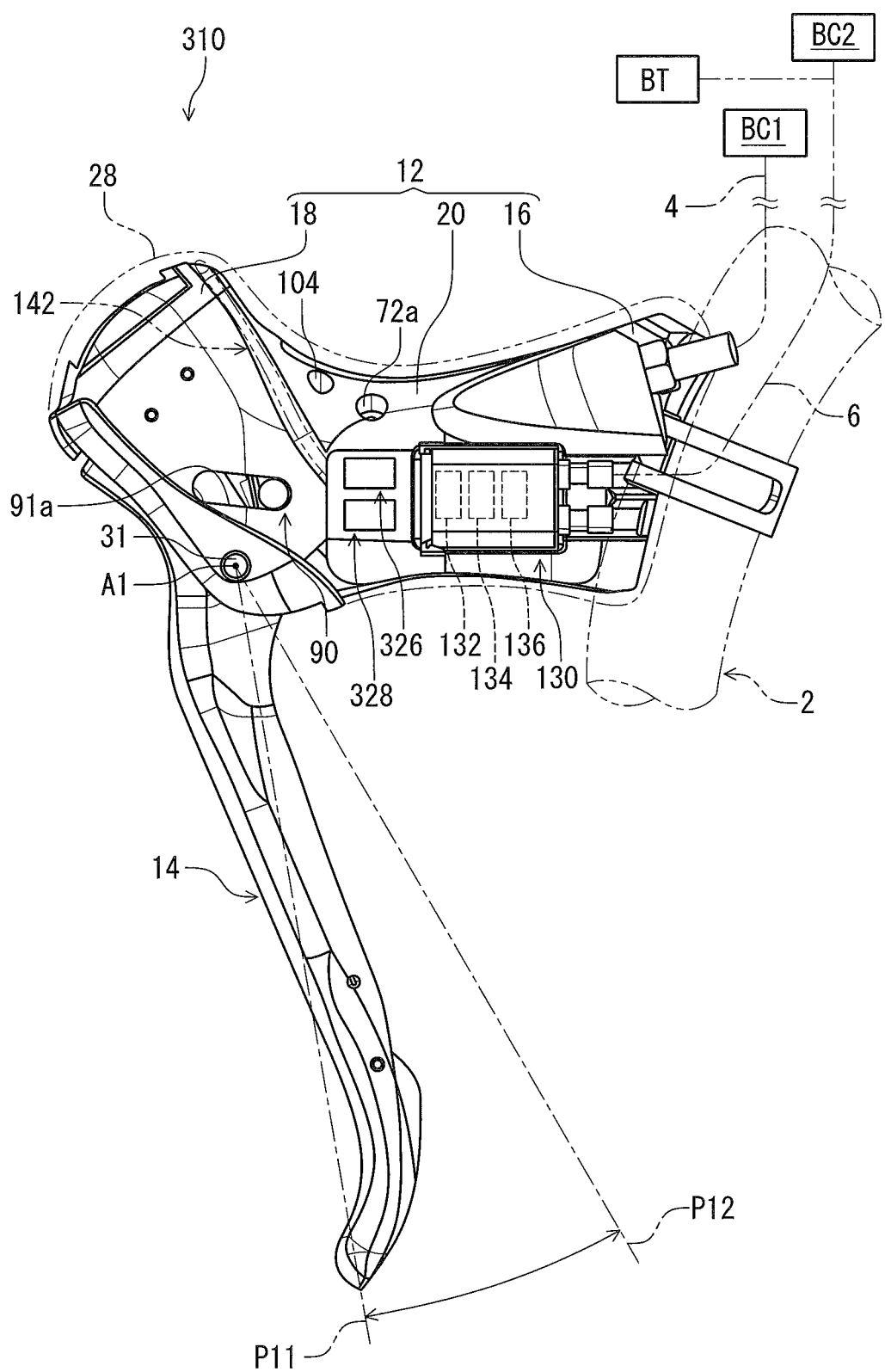
FIG. 12 is a side elevational view of a bicycle operating device in accordance with a third embodiment.

As seen in FIG. 12, the bicycle operating device 310 comprise electrical switches 326 and 328. The electrical switches 326 and 328 have substantially the same configurations as those of the electrical switches 126 and 128. In the illustrated embodiment, however, the electrical switches 326 and 328 are provided at the base member 12.

It will be apparent to those skilled in the bicycle field from the present disclosure that the constructions of the above embodiments can at least partially combined with each other if needed and/or desired.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle operating device comprising:
   a base member comprising:
      a first end portion configured to be mounted to a handlebar;
      a second end portion opposite to the first end portion; and
      a gripping portion provided between the first end portion and the second end portion;
   an operating member movably mounted to the base member about a pivot axis that passes through the base member from a rest position toward an operated position; and
   a hydraulic unit provided at one of the base member and the operating member, the hydraulic unit comprising:
      a hydraulic cylinder including a cylinder bore; and
      a piston arranged in the cylinder bore, the piston being configured to be pulled in a direction away from the first end portion from an initial position to an actuated position in response to a movement of the operating member from the rest position toward the operated position to supply a hydraulic pressure toward at least one bicycle component,
   the cylinder bore arranged in a lower portion of the base member between the first end portion and the pivot axis such that a center axis of the cylinder bore is arranged above the pivot axis in a mounting state where the base member is mounted to the handlebar.

2. The bicycle operating device according to claim 1, wherein
the hydraulic unit is provided at the base member.

3. The bicycle operating device according to claim 2, further comprising:
a biasing member to bias the piston from the actuated position toward the initial position, wherein
the biasing member is provided outside the cylinder bore and extends to a height above the hydraulic cylinder in the mounting state.

4. The bicycle operating device according to claim 3, wherein
the biasing member is provided in the second end portion.

5. The bicycle operating device according to claim 2, further comprising:
a hydraulic reservoir connected to the hydraulic cylinder.

6. The bicycle operating device according to claim 5, wherein
the hydraulic reservoir is provided at the base member.

7. The bicycle operating device according to claim 6, wherein
the hydraulic reservoir is at least partially provided above the hydraulic cylinder in the mounting state where the base member is mounted to the handlebar.

8. The bicycle operating device according to claim 5, further comprising:
a bleeding port connected to the hydraulic reservoir to bleed a hydraulic fluid provided in the hydraulic reservoir.

9. The bicycle operating device according to claim 1, further comprising:
a first adjusting member to adjust the initial position of the piston relative to the cylinder bore.

10. The bicycle operating device according to claim 1, further comprising:
a second adjusting member to adjust the rest position of the operating member relative to the base member.

11. The bicycle operating device according to claim 1, further comprising:
a stabilizer to stabilize the operating member at the rest position relative to the base member.

12. The bicycle operating device according to claim 1, further comprising:
an electrical switch to receive an input operation, wherein
the electrical switch is provided at one of the base member and the operating member.

13. The bicycle operating device according to claim 12, further comprising:
a connector to detachably receive an electrical control cable to electrically connect the electrical control cable to the electrical switch, wherein
the connector is provided at one of the base member and the operating member.

14. The bicycle operating device according to claim 13, further comprising:
an electronic substrate electrically connected to the electrical switch and the connector, wherein
the electronic substrate is provided at one of the base member and the operating member.

15. The bicycle operating device according to claim 1, further comprising:
a shift operating unit provided at the base member to move a mechanical control cable.

16. The bicycle operating device according to claim 1, further comprising:
a mounting structure to mount the first end portion to the handlebar, wherein
the hydraulic cylinder is at least partially provided below the mounting structure in the mounting state where the base member is mounted to the handlebar.

17. The bicycle operating device according to claim 1, wherein
the first end portion includes a mounting surface,
the mounting surface is in contact with the handlebar in the mounting state where the base member is mounted to the handlebar,
the hydraulic cylinder includes an end plug to close an end of the cylinder bore, and
the end plug is provided on the mounting surface.

18. The bicycle operating device according to claim 1, further comprising:
a piston rod coupled to the piston; and
a seal member in contact with the piston rod, wherein
the base member includes
a through-hole coupled to the cylinder bore, and
an arrangement portion on which the seal member is arranged,
the piston rod extends through the through-hole, and
a first distance defined between an end of the cylinder bore and an end of the arrangement portion is equal to or longer than 1 mm.

19. The bicycle operating device according to claim 1, further comprising:
a piston rod coupled to the piston; and
a seal member in contact with the piston rod, wherein
the base member includes
a through-hole coupled to the cylinder bore, and
an arrangement portion on which the seal member is arranged,
the piston rod extends through the through-hole, and
a first distance defined between an end of the cylinder bore and an end of the arrangement portion is equal to or longer than 10% of a second distance defined between an end of the piston and the end of the cylinder bore in a state where the piston is at the initial position.

20. A bicycle operating device comprising:
a base member comprising:
a first end portion;
a second end portion opposite to the first end portion; and
a gripping portion provided between the first end portion and the second end portion;
an operating member pivotally coupled to the base member about a pivot axis; and
a hydraulic unit provided at the base member, the hydraulic unit comprising:
a hydraulic cylinder including a cylinder bore defining a center axis, and
a piston arranged in the cylinder bore and movable relative to the hydraulic cylinder along the center axis,
the pivot axis being arranged below the center axis in a mounting state where the base member is mounted to a handlebar, the gripping portion being arranged about the center axis in the mounting state,
the piston being closer to the first end portion than the pivot axis, and
the cylinder bore arranged in a lower portion of the base member between the first end portion and the pivot axis.

21. A bicycle operating device comprising:
a base member configured to be mounted to a handlebar, the base member including a through-hole and an arrangement portion;

an operating member movably mounted to the base member from a rest position toward an operated position; and a hydraulic unit provided at one of the base member and the operating member, the hydraulic unit comprising:
  a hydraulic cylinder including a cylinder bore coupled to the through-hole; and
  a piston arranged in the cylinder bore, the piston being configured to be pulled from an initial position to an actuated position in response to a movement of the operating member from the rest position toward the operated position to supply a hydraulic pressure toward at least one bicycle component;

a piston rod coupled to the piston and extending through the through-hole; and a seal member arranged on the arrangement portion to be in direct contact with the piston rod, a first distance defined between an end of the cylinder bore and an end of the arrangement portion being equal to or longer than 1 mm.

22. The bicycle operating device according to claim 21, wherein
the base member comprises
  a first end portion,
  a second end portion opposite to the first end portion, and
  a gripping portion provided between the first end portion and the second end portion.

23. A bicycle operating device comprising:
a base member configured to be mounted to a handlebar, the base member including a through-hole and an arrangement portion;

an operating member movably mounted to the base member from a rest position toward an operated position; and a hydraulic unit provided at one of the base member and the operating member, the hydraulic unit comprising:
  a hydraulic cylinder including a cylinder bore coupled to the through-hole; and
  a piston arranged in the cylinder bore, the piston being configured to be pulled from an initial position to an actuated position in response to a movement of the operating member from the rest position toward the operated position to supply a hydraulic pressure toward at least one bicycle component;

a piston rod coupled to the piston and extending through the through-hole; and a seal member arranged on the arrangement portion to be in direct contact with the piston rod, a first distance defined between an end of the cylinder bore and an end of the arrangement portion being equal to or longer than 10% of a second distance defined between an end of the piston and the end of the cylinder bore in a state where the piston is at the initial position.

24. The bicycle operating device according to claim 23, wherein
the base member comprises
  a first end portion,
  a second end portion opposite to the first end portion, and
  a gripping portion provided between the first end portion and the second end portion.

* * * * *